US012273055B2

(12) United States Patent
Ohori et al.

(10) Patent No.: US 12,273,055 B2
(45) Date of Patent: Apr. 8, 2025

(54) MOTOR DEVICE, WIPER DEVICE, AND MOTOR CONTROL METHOD

(71) Applicant: MITSUBA Corporation, Gunma (JP)

(72) Inventors: Ryo Ohori, Gunma (JP); Tsuyoshi Osawa, Gunma (JP); Atsushi Mochida, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 18/035,295

(22) PCT Filed: Mar. 31, 2022

(86) PCT No.: PCT/JP2022/016589
§ 371 (c)(1),
(2) Date: May 4, 2023

(87) PCT Pub. No.: WO2023/067828
PCT Pub. Date: Apr. 27, 2023

(65) Prior Publication Data
US 2023/0421084 A1 Dec. 28, 2023

(30) Foreign Application Priority Data
Oct. 22, 2021 (JP) .................. 2021-172965

(51) Int. Cl.
*H02P 29/00* (2016.01)
*H02P 23/14* (2006.01)
*H02P 27/08* (2006.01)

(52) U.S. Cl.
CPC .............. *H02P 23/14* (2013.01); *H02P 27/08* (2013.01)

(58) Field of Classification Search
CPC ............ H02P 23/14; H02P 27/08; B62M 6/50
See application file for complete search history.

(56) References Cited

U.S. PATENT DOCUMENTS

| 2019/0315433 | A1* | 10/2019 | Hasumi .................... B62M 6/50 |
| 2019/0329736 | A1* | 10/2019 | Doi .......................... B60S 1/16 |
| 2021/0078153 | A1* | 3/2021 | Sunabe ............... H02P 29/0027 |

FOREIGN PATENT DOCUMENTS

| JP | S6434190 | 2/1989 |
| JP | H0270280 | 3/1990 |

(Continued)

OTHER PUBLICATIONS

"International Search Report (Form PCT/ISA/210) of PCT/JP2022/016589", mailed on Jun. 7, 2022, pp. 1-3.
(Continued)

*Primary Examiner* — Cortez M Cook
(74) *Attorney, Agent, or Firm* — JCIPRNET

(57) ABSTRACT

The invention reduces the stoppage of operation due to a sudden decrease in rotation speed. A motor device includes a motor that is rotationally driven; a drive signal generator that controls a duty ratio indicating a drive output of the motor so as not to exceed a duty ratio upper limit value, and generates a drive signal corresponding to the duty ratio; an inverter that outputs an output signal for rotationally driving the motor based on the drive signal; a rotation speed detector that detects a rotation speed of the motor; an acceleration detector that detects whether the motor is accelerating; and an upper limit value setting part that changes the duty ratio upper limit value to a second upper limit value higher than a preset first upper limit value in response to rotation of the motor being accelerating.

8 Claims, 5 Drawing Sheets

(56) References Cited

FOREIGN PATENT DOCUMENTS

| | | |
|---|---|---|
| JP | 2003247640 | 9/2003 |
| JP | 2016154419 | 8/2016 |
| JP | 2019043203 | 3/2019 |

OTHER PUBLICATIONS

"International Preliminary report on patentability (Form PCT/IB/338) mailed on May 2, 2024, International Preliminary report on patentability (Form PCT/IB/373) issued Apr. 23, 2024, Written Opinion (Form PCT/ISA/237) with English translation thereof mailed on Jun. 7, 2022, and International Preliminary report on patentability (Form PCT/IB/326) mailed on May 2, 2024 of PCT/JP2022/016589", pp. 1-11.

* cited by examiner

MOTOR DEVICE, WIPER DEVICE, AND MOTOR CONTROL METHOD

CROSS-REFERENCE TO RELATED APPLICATION

This application is a 371 application of the International PCT application serial no. PCT/JP2022/016589, filed on Mar. 31, 2022, which claims the priority benefits of Japan Patent Application No. 2021-172965, filed on Oct. 22, 2021. The entirety of each of the above-mentioned patent applications is hereby incorporated by reference herein and made a part of this specification.

TECHNICAL FIELD

The invention relates to a motor device, a wiper device, and a motor control method.

RELATED ART

In terms of motor devices used in wiper devices for vehicles or the like, in recent years, there are motor devices that have a function of limiting the output duty of the motor according to the rotation speed of the motor in order to protect the magnet from demagnetization and prevent an overcurrent (see, for example, Patent Literature 1).

CITATION LIST

Patent Literature

[Patent Literature 1] Japanese Patent Laid-Open No. 2019-43203

SUMMARY OF INVENTION

Technical Problem

However, in the case where the motor device as described above is used in a wiper device, for example, if a sudden load such as strong wind or falling snow is applied to the wiper blade while the motor is operating and causes the rotation speed of the motor to decrease, the above-mentioned output duty limiting function may work to stop the operation of the motor, and the normal operation cannot be resumed immediately.

In view of the above, the invention provides a motor device, a wiper device, and a motor control method capable of reducing the stoppage of operation due to a sudden decrease in rotation speed.

Solution to Problem

In view of the above, one aspect of the invention provides a motor device, including: a motor that is rotationally driven; a drive signal generator that controls a duty ratio indicating a drive output of the motor so as not to exceed a duty ratio upper limit value, and generates a drive signal corresponding to the duty ratio; an inverter that outputs an output signal for rotationally driving the motor based on the drive signal; a rotation speed detector that detects a rotation speed of the motor; an acceleration detector that detects whether the motor is accelerating; and an upper limit value setting part that changes the duty ratio upper limit value to a second upper limit value higher than a preset first upper limit value in response to rotation of the motor being accelerating.

Another aspect of the invention provides a motor control method for controlling a motor that is rotationally driven by an output signal output by an inverter based on a drive signal. The motor control method includes: drive signal generating in which a drive signal generator controls a duty ratio indicating a drive output of the motor so as not to exceed a duty ratio upper limit value, and generates the drive signal corresponding to the duty ratio; rotation speed detecting in which a rotation speed detector detects a rotation speed of the motor; acceleration detecting in which an acceleration detector detects whether the motor is accelerating; and upper limit value setting in which an upper limit value setting part changes the duty ratio upper limit value to a second upper limit value higher than a preset first upper limit value in response to rotation of the motor being accelerating.

Effects of Invention

According to the invention, it is possible to reduce the stoppage of operation due to a sudden decrease in rotation speed.

DESCRIPTION OF EMBODIMENTS

Hereinafter, a motor device, a wiper device, and a motor control method according to an embodiment of the invention will be described with reference to the drawings.

First Embodiment

Figure 1:
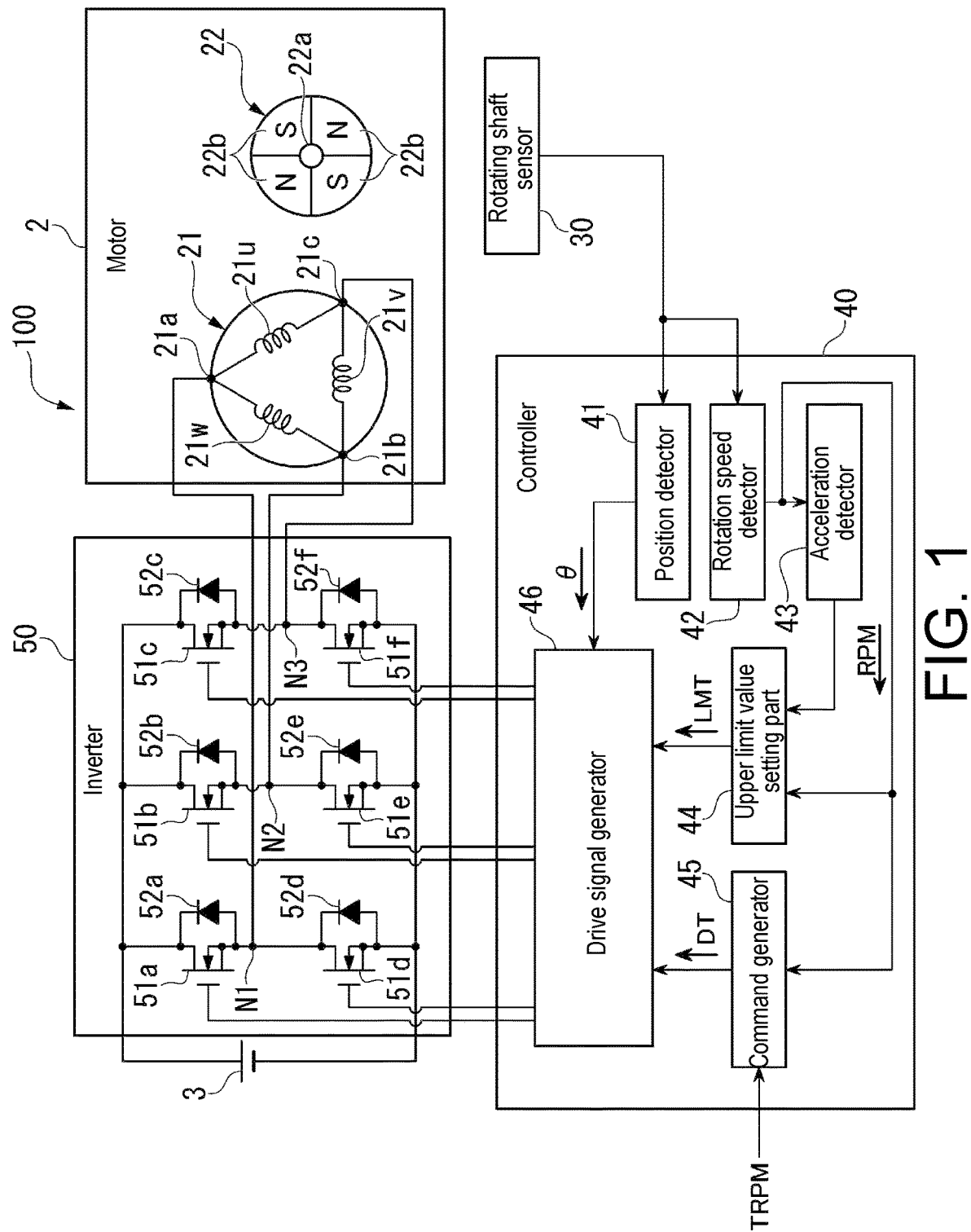
FIG. 1 is a block diagram showing an example of the motor device according to the first embodiment.

FIG. 1 is a block diagram showing an example of a motor device 100 according to the first embodiment.

As shown in FIG. 1, the motor device 100 includes a motor 2, a rotating shaft sensor 30, a controller 40, and an inverter 50.

The motor device 100 according to this embodiment is used, for example, in a wiper device for wiping the window glass of a vehicle.

The motor 2 is, for example, a three-phase four-pole brushless motor. The motor 2 is rotationally driven by an output signal output by the inverter 50 based on a drive signal which will be described later.

In addition, the motor 2 includes a stator 21 and a rotor 22.

The stator 21 is fixed to the inner circumference of the case of the motor 2. The stator 21 includes three-phase armature coils (21u, 21v, 21w). The stator 21 is wound with the armature coils (21u, 21v, 21w). For example, the three-phase armature coils (21u, 21v, 21w) are connected by delta connection.

In the delta connection, the armature coil 21u and the armature coil 21w are connected by a connection point 21a, the armature coil 21v and the armature coil 21w are connected by a connection point 21b, and the armature coil 21u and the armature coil 21v are connected by a connection point 21c.

The rotor 22 is provided inside the stator 21. The rotor 22 includes, for example, a rotor shaft 22a and four-pole permanent magnets 22b attached to the rotor shaft 22a. A plurality of bearings (not shown) are provided in the case of the motor 2, and the rotor shaft 22a is rotatably supported by the plurality of bearings.

The rotating shaft sensor 30 detects a signal corresponding to the rotation of the rotor 22. The rotating shaft sensor 30 includes, for example, three Hall ICs (not shown). These three Hall ICs output pulse signals with phases shifted by 120 degrees from each other to the controller 40 when the rotor 22 rotates. That is, as the rotor 22 rotates, the rotating shaft sensor 30 generates pulse signals based on a change in the magnetic pole of a sensor magnet (not shown) arranged on the rotor shaft 22a and outputs the pulse signals to the controller 40. Each Hall IC detects a position shifted by an electrical angle of 120°.

The controller 40 is a processor including, for example, a CPU (Central Processing Unit) or the like, and controls the motor device 100 in an integrated manner. The controller 40 performs PWM (Pulse Width Modulation) control, sets a duty ratio corresponding to the target rotation output of the rotor 22 (for example, target rotation speed TRPM), and outputs a drive signal corresponding to the set duty ratio to the inverter 50. Further, the controller 40 controls the driving of the motor 2 via the inverter 50 by, for example, rectangular wave energization.

The controller 40 also includes a position detector 41, a rotation speed detector 42, an acceleration detector 43, an upper limit value setting part 44, a command generator 45, and a drive signal generator 46.

The position detector 41 detects the rotational position (θ) of the rotor 22 based on the pulse signal supplied from the rotating shaft sensor 30. The position detector 41 outputs the detected rotational position of the rotor 22 to the drive signal generator 46 which will be described later.

The rotation speed detector 42 detects, for example, the rotation speed (RPM) of the motor 2 (rotor 22) based on the pulse signal supplied from the rotating shaft sensor 30, and outputs the detected rotation speed of the motor 2 (rotor 22) to the acceleration detector 43, the upper limit value setting part 44, and the command generator 45 which will be described later.

In this specification, the "rotation speed" means the "speed of rotation" indicating the number of rotations per unit time.

The acceleration detector 43 detects whether the rotation of the motor 2 is accelerating. The acceleration detector 43 detects that the motor 2 is accelerating when, for example, the rotation speed detected by the rotation speed detector 42 every predetermined time increases continuously for a predetermined number of times. The acceleration detector 43 outputs the detection result as to whether the motor 2 is accelerating to the upper limit value setting part 44.

The upper limit value setting part 44 sets a duty limit value (duty ratio upper limit value) that is the upper limit value of the duty ratio (also referred to as output duty) indicating the drive output of the motor 2. The duty limit value includes a preset normal duty limit value (first upper limit value) and a corrected duty limit value (second upper limit value) used during acceleration of the motor 2, and the upper limit value setting part 44 switches between the normal duty limit value (first upper limit value) and the corrected duty limit value (second upper limit value) and outputs.

The normal duty limit value is a limit value used during the normal operation other than during acceleration. The upper limit value setting part 44 changes and sets the normal duty limit value according to the rotation speed of the motor 2 (hereinafter, may be referred to as the motor rotation speed). For example, the upper limit value setting part 44 changes the normal duty limit value to a higher value as the rotation speed increases, and changes the normal duty limit value to a lower value as the rotation speed decreases. Specifically, the upper limit value setting part 44 changes the normal duty limit value according to the motor rotation speed, as shown in FIG. 3 which will be described later.

When the motor rotation speed is lower than a first threshold value, the upper limit value setting part 44 keeps the normal duty limit value constant at the minimum value, and when the motor rotation speed is higher than a second threshold value, the upper limit value setting part 44 keeps the normal duty limit value constant at the maximum value. The second threshold value is higher than the first threshold value. Furthermore, the upper limit value setting part 44 changes the normal duty limit value according to the motor rotation speed when the motor rotation speed is between the first threshold value and the second threshold value.

Figure 3:
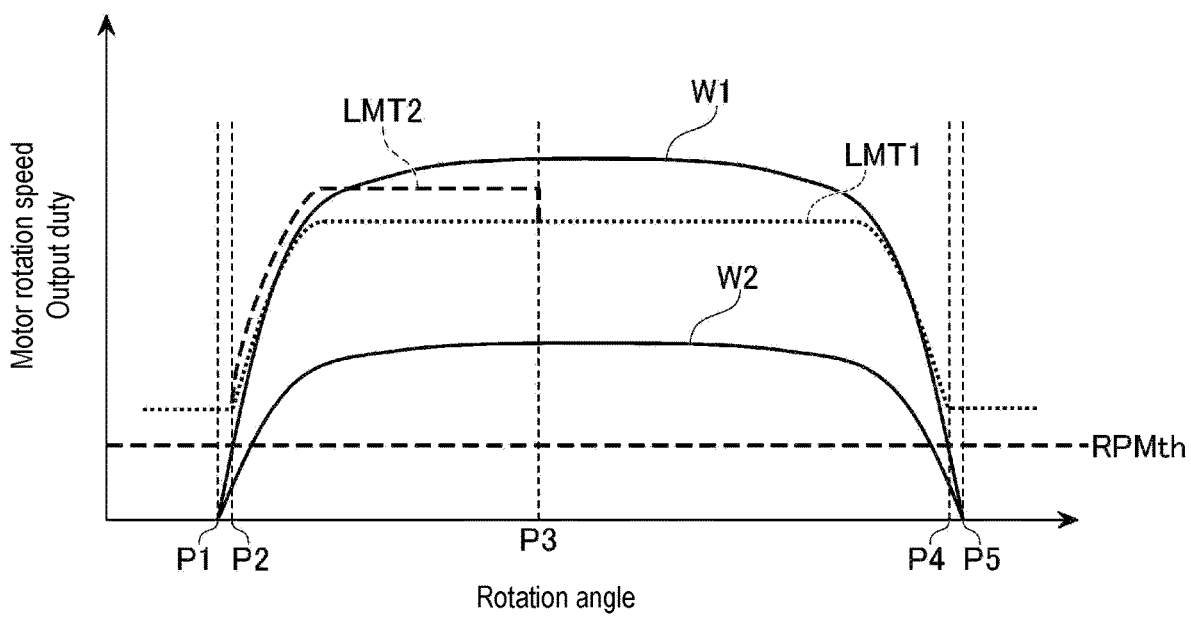
FIG. 3 is a diagram illustrating an example of the switching operation for the duty limit value of the motor device according to the first embodiment.
Figure 5:
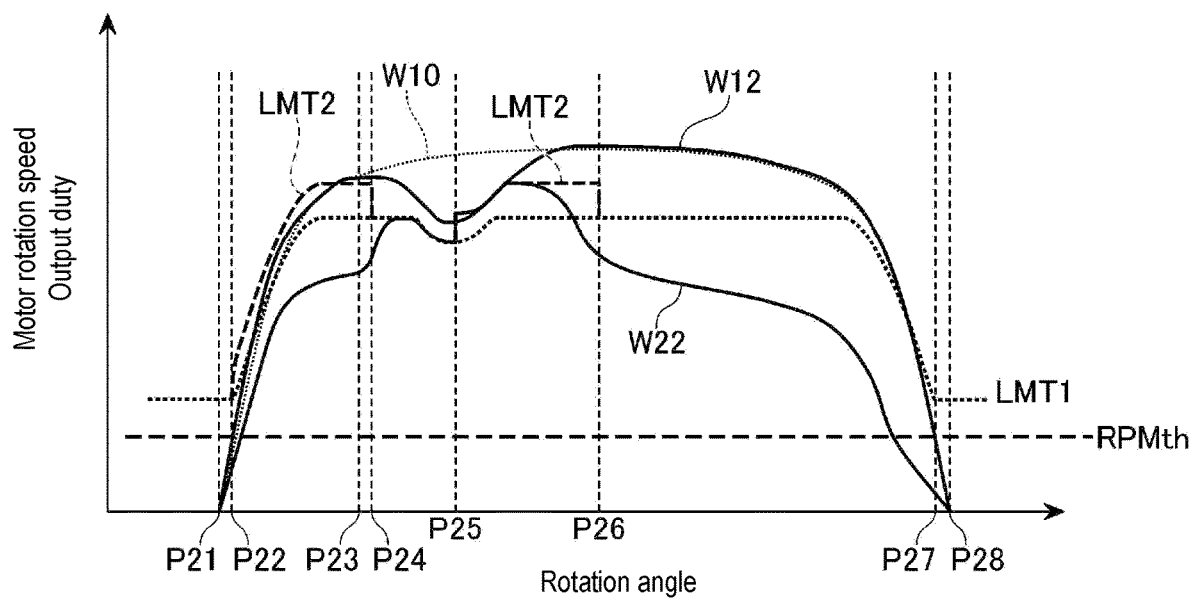
FIG. 5 is a diagram showing an example of the operation related to the duty limit value of the motor device according to the first embodiment.

In FIG. 3 and FIG. 5 which will be described later, the first threshold value and the rotation speed threshold value (RPMth), which will be described later, are the same value, but the invention is not limited thereto, and the first threshold value may be a value less than the rotation speed threshold value.

Further, when the rotation of the motor 2 is accelerating, the upper limit value setting part 44 changes the duty limit value to the corrected duty limit value higher than the preset normal duty limit value. The upper limit value setting part 44 switches between the normal duty limit value and the corrected duty limit value and outputs, for example, according to the detection result as to whether the motor 2 is accelerating, output from the acceleration detector 43. For example, as shown in FIG. 3 which will be described later, the upper limit value setting part 44 switches from the normal duty limit value (LMT1) to the corrected duty limit value (LMT2) and outputs during acceleration of the motor 2.

That is, the upper limit value setting part 44 outputs the corrected duty limit value (LMT2) to the drive signal generator 46 as the duty limit value (LMT) when the motor 2 is accelerating. In addition, the upper limit value setting part 44 outputs the normal duty limit value (LMT1) to the drive signal generator 46 as the duty limit value (LMT) when the motor 2 is not accelerating (decelerating or driving at a constant speed).

The upper limit value setting part 44 sets the corrected duty limit value by adding a correction amount (a) to the normal duty limit value, for example, as shown in the following equation (1). Here, a is a predetermined fixed value.

$$\text{Corrected duty limit value} = \text{normal duty limit value} + \alpha \quad (1)$$

In the case where the correction amount is generated for the normal duty limit value by the equation (1), when the normal duty limit value is changed according to the rotation speed of the motor 2, the corrected duty limit value is also changed according to the rotation speed of the motor 2. That is, the upper limit value setting part 44 changes the corrected duty limit value according to the rotation speed of the motor 2.

Further, the upper limit value setting part 44 may change the correction amount according to the rotation speed, as shown in the following equation (2).

$$\text{Corrected duty limit value} = \text{normal duty limit value} + \alpha \times \text{rotation speed} \quad (2)$$

In this case, ($\alpha \times$rotation value) corresponds to the correction value. In this case, since the upper limit value setting part 44 changes the correction amount according to the rotation speed, the corrected duty limit value is changed according to the rotation speed of the motor 2 as a result.

Further, the upper limit value setting part 44 may change the corrected duty limit value according to the magnitude of the rotational acceleration of the motor 2. In this case, the upper limit value setting part 44 changes the above-mentioned correction value to a larger value, for example, as the rotational acceleration increases.

Moreover, the upper limit value setting part 44 disables a changing process of changing from the normal duty limit value to the corrected duty limit value when the rotation speed of the motor 2 is equal to or less than the threshold value (equal to or less than the rotation speed threshold value). That is, the upper limit value setting part 44 performs control to output the normal duty limit value without using the corrected duty limit value even during acceleration when the rotation speed of the motor 2 is low.

The command generator 45 generates an output command value (a command value for PWM control) according to the target rotation output (for example, target rotation speed TRPM) of the motor 2. For example, the command generator 45 generates a duty ratio, which is a command value for PWM control, according to the current rotation speed (RPM) of the motor 2 acquired from the position detector 41 and the target rotation speed TRPM, and outputs the generated output command value to the drive signal generator 46 as an output command value (DT).

Based on the output command value (DT) output by the command generator 45, the drive signal generator 46 generates a drive signal so that a voltage having an energization waveform based on a sine wave is applied to the three-phase armature coils ($21u$, $21v$, $21w$) at an energization timing corresponding to the rotational position of the rotor 22. For example, the drive signal generator 46 generates a three-phase energization timing signal based on the rotational position ($\theta$), generates a drive signal (three-phase drive signal) for driving (conducting/non-conducting) switching elements ($51a$ to $51f$) of the inverter 50, which will be described later, by PWM control based on the output command value (DT), and outputs the generated drive signal (three-phase drive signal) to the inverter 50.

Further, when the output command value (DT) is a duty ratio greater than the duty limit value (LMT) output from the upper limit value setting part 44, the drive signal generator 46 generates a drive signal (three-phase drive signal) by PWM control using the duty limit value (LMT) instead of the output command value (DT). Thus, the drive signal generator 46 controls the duty ratio indicating the drive output of the motor 2 so as not to exceed the duty limit value (LMT), and generates a drive signal corresponding to the duty ratio.

The inverter 50 outputs an output signal for rotationally driving the motor 2 based on the drive signal generated by the drive signal generator 46. That is, the inverter 50 drives the switching elements ($51a$ to $51f$) based on the drive signal generated by the drive signal generator 46, and applies an applied voltage based on the energization waveform to the three-phase armature coils ($21u$, $21v$, $21w$).

The inverter 50 generates the applied voltage from the DC power supplied from a battery 3.

The inverter 50 includes six switching elements $51a$ to $51f$ and diodes $52a$ to $52f$, which are three-phase bridge-connected.

The switching elements $51a$ to $51f$ are, for example, N-channel MOSFETs (Metal Oxide Semiconductor Field Effect Transistors), and constitute a three-phase bridge circuit.

The switching element $51a$ and the switching element $51d$ are connected in series between the positive terminal and the negative terminal of the battery 3 to constitute a U-phase bridge circuit. The switching element $51a$ has a drain terminal connected to the positive terminal of the battery 3, a source terminal connected to the node N1, and a gate terminal connected to the signal line of the U-phase upper drive signal. Further, the switching element $51d$ has a drain terminal connected to the node N1, a source terminal connected to the negative terminal of the battery 3, and a gate terminal connected to the signal line of the U-phase lower drive signal. In addition, the node N1 is connected to the connection point $21a$ of the motor 2.

The switching element $51b$ and the switching element $51e$ are connected in series between the positive terminal and the negative terminal of the battery 3 to constitute a V-phase bridge circuit. The switching element $51b$ has a drain terminal connected to the positive terminal of the battery 3, a source terminal connected to the node N2, and a gate terminal connected to the signal line of the V-phase upper drive signal. Further, the switching element $51e$ has a drain terminal connected to the node N2, a source terminal connected to the negative terminal of the battery 3, and a gate terminal connected to the signal line of the V-phase lower drive signal. In addition, the node N2 is connected to the connection point $21b$ of the motor 2.

The switching element $51c$ and the switching element $51f$ are connected in series between the positive terminal and the negative terminal of the battery 3 to constitute a W-phase bridge circuit. The switching element $51c$ has a drain terminal connected to the positive terminal of the battery 3, a source terminal connected to the node N3, and a gate terminal connected to the signal line of the W-phase upper drive signal. Further, the switching element $51f$ has a drain terminal connected to the node N3, a source terminal connected to the negative terminal of the battery 3, and a gate terminal connected to the signal line of the W-phase lower drive signal. In addition, the node N3 is connected to the connection point $21c$ of the motor 2.

Furthermore, the diode $52a$ has an anode terminal connected to the node N1 and a cathode terminal connected to the positive terminal of the battery 3. The diode $52d$ has an anode terminal connected to the negative terminal of the battery 3 and a cathode terminal connected to the node N1.

Besides, the diode 52b has an anode terminal connected to the node N2 and a cathode terminal connected to the positive terminal of the battery 3. The diode 52e has an anode terminal connected to the negative terminal of the battery 3 and a cathode terminal connected to the node N2.

In addition, the diode 52c has an anode terminal connected to the node N3 and a cathode terminal connected to the positive terminal of the battery 3. The diode 52f has an anode terminal connected to the negative terminal of the battery 3 and a cathode terminal connected to the node N3.

The battery 3 is, for example, a DC power supply such as a lead storage battery or a lithium-ion battery, and supplies electric power for driving the motor 2.

Next, the operation of the motor device 100 according to this embodiment will be described with reference to the drawings.

Figure 2:
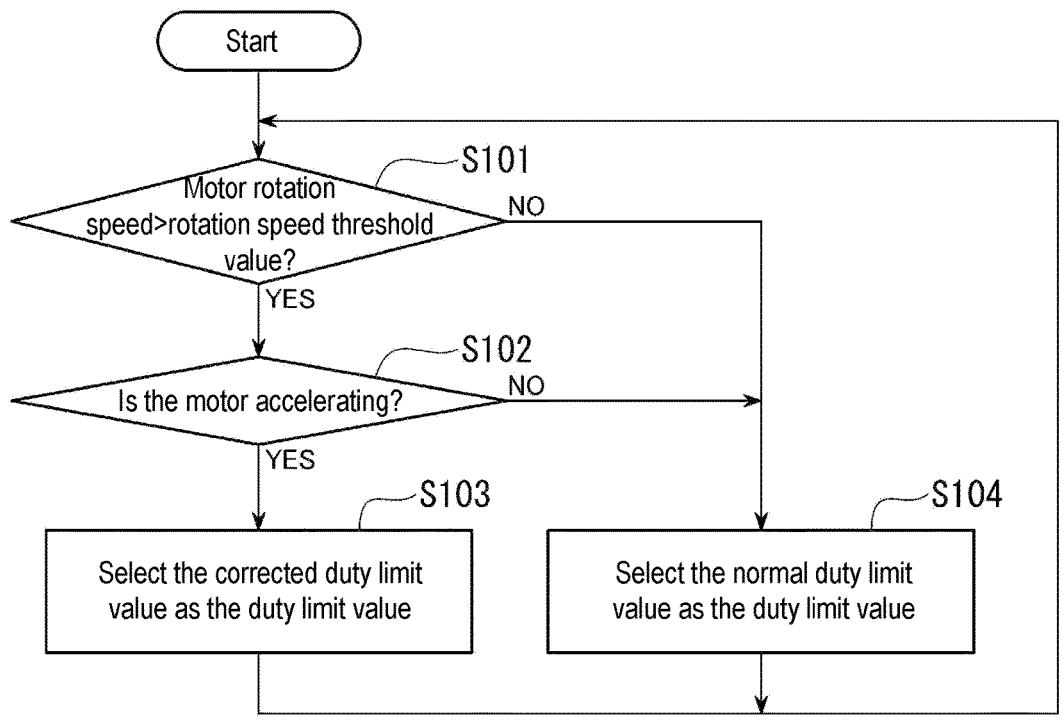
FIG. 2 is a flowchart showing an example of the switching process for the duty limit value of the motor device according to the first embodiment.

FIG. 2 is a flowchart showing an example of a switching process for the duty limit value of the motor device 100 according to this embodiment. Here, the operation of the upper limit value setting part 44 of the controller 40 will be described.

As shown in FIG. 2, the upper limit value setting part 44 first determines whether the motor rotation speed is greater than the rotation threshold value (step S101). The upper limit value setting part 44 acquires the motor rotation speed RPM detected by the rotation speed detector 42, and determines whether the motor rotation speed RPM is greater than the rotation threshold value (whether the motor rotation speed RPM is equal to or less than the rotation threshold value). When the motor rotation speed RPM is greater than the rotation threshold value (step S101: YES), the upper limit value setting part 44 advances the process to step S102. Further, when the motor rotation speed RPM is equal to or less than the rotation threshold value (step S101: NO), the upper limit value setting part 44 advances the process to step S104.

In step S102, the upper limit value setting part 44 determines whether the motor 2 is accelerating. The upper limit value setting part 44 determines whether the motor 2 is accelerating by the detection result output by the acceleration detector 43, for example. When the motor 2 is accelerating (step S102: YES), the upper limit value setting part 44 advances the process to step S103. In addition, when the motor 2 is not accelerating (step S102: NO), the upper limit value setting part 44 advances the process to step S104.

In step S103, the upper limit value setting part 44 selects the corrected duty limit value as the duty limit value. That is, the upper limit value setting part 44 outputs the corrected duty limit value to the drive signal generator 46 as the duty limit value (LMT). After the process of step S103, the upper limit value setting part 44 returns the process to step S101.

Further, in step S104, the upper limit value setting part 44 selects the normal duty limit value as the duty limit value. That is, the upper limit value setting part 44 outputs the normal duty limit value to the drive signal generator 46 as the duty limit value (LMT). After the process of step S104, the upper limit value setting part 44 returns the process to step S101.

Next, a switching operation for the duty limit value of the motor device 100 according to this embodiment will be described with reference to FIG. 3.

FIG. 3 is a diagram illustrating an example of the switching operation for the duty limit value of the motor device 100 according to this embodiment.

In FIG. 3, the horizontal axis indicates the rotation angle, and the vertical axis indicates the motor rotation speed and the output duty.

In addition, the waveform W1 indicates the motor rotation speed, and the waveform W2 indicates the output duty, which is the output command value. Further, the dotted line LMT1 indicates the normal duty limit value, and the dotted line LMT2 indicates the corrected duty limit value. The dotted line RPMth indicates the rotation speed threshold value.

In FIG. 3, it is assumed that the motor 2 is driven along the target rotation speed. In other words, the waveform W1 is the motor rotation speed and is also the target rotation speed.

The example shown in FIG. 3 shows an example in which the motor device 100 operates normally, and as indicated by the waveform W1, the controller 40 controls the motor 2 to rotate at a predetermined speed by increasing the rotation speed from a stop, and then decelerates the motor 2 to reduce the rotation speed and stop the motor 2. Also, in this case, the command generator 45 of the controller 40 outputs an output command value (DT) as indicated by the waveform W2.

The operation of the motor device 100 in FIG. 3 will be described in more detail. First, from point P1 to immediately before point P2, the motor rotation speed is equal to or less than the rotation speed threshold value (RPMth). In this case, the upper limit value setting part 44 of the controller 40 generates the normal duty limit value (LMT1) corresponding to the motor rotation speed. Further, the upper limit value setting part 44 outputs the normal duty limit value (LMT1) as the duty limit value (LMT).

Next, from point P2 to immediately before point P3, the motor rotation speed is greater than the rotation speed threshold value (RPMth) and is accelerating. In this case, the upper limit value setting part 44 switches the duty limit value (LMT) from the normal duty limit value (LMT1) to the corrected duty limit value (LMT2) and outputs.

Next, from point P3 to immediately before point P4, the motor rotation speed is greater than the rotation speed threshold value (RPMth) and is not accelerating. In this case, the upper limit value setting part 44 switches the duty limit value (LMT) from the corrected duty limit value (LMT2) to the normal duty limit value (LMT1) and outputs.

Further, from point P4 to point P5, the motor rotation speed is equal to or less than the rotation speed threshold value (RPMth) and is not accelerating. In this case, the upper limit value setting part 44 continues to output the normal duty limit value (LMT1) as the duty limit value (LMT).

In the example shown in FIG. 3, since the output command value (DT) indicated by the waveform W2 is lower than the duty limit value (LMT=LMT1 or LMT2), without being limited by the duty limit value (LMT), the drive signal generator 46 generates a drive signal (three-phase drive signal) based on the output command value (DT) so that the motor rotation speed changes like the target rotation speed (waveform W1).

Next, the operation of the motor device 100 according to this embodiment when a sudden load is applied will be described with reference to FIG. 4 and FIG. 5.

Figure 4:
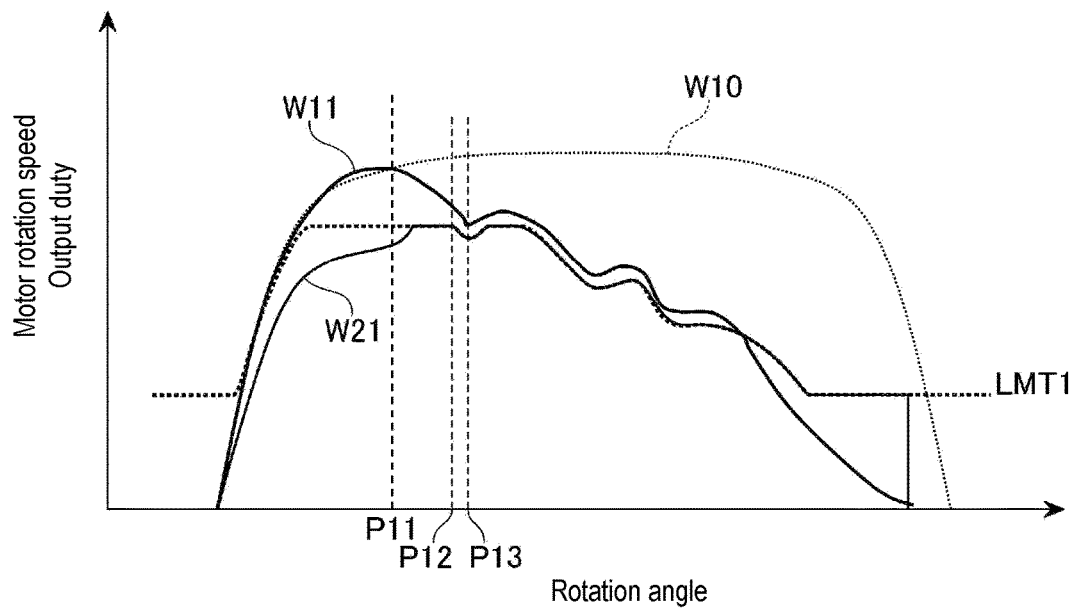
FIG. 4 is a diagram showing the operation related to the duty limit value in the conventional art.

For comparison, FIG. 4 is a diagram showing the operation related to the duty limit value in the conventional art. That is, FIG. 4 shows the operation of a conventional motor device when only the normal duty limit value is used as the duty limit value.

In FIG. 4, the horizontal axis indicates the rotation angle, and the vertical axis indicates the motor rotation speed and the output duty.

Further, in FIG. 4, the waveform W10 indicates the target rotation speed, and the waveform W11 indicates the motor rotation speed. The waveform W21 indicates the output duty, which is the output command value. The dotted line LMT1 indicates the duty limit value, which is the normal duty limit value. The dotted line RPMth indicates the rotation speed threshold value.

Further, point P11 indicates the timing at which a sudden load is applied to the conventional motor device. Point P13 indicates the timing at which the sudden load on the conventional motor device is eliminated or reduced.

As shown in FIG. 4, for the conventional motor device, when a sudden load is applied at point P11, the motor rotation speed indicated by the waveform W11 becomes lower than the target rotation speed indicated by the waveform W10. Then, in order to raise the motor rotation speed to the target rotation speed, the output duty indicated by the waveform W21 is increased. However, if the load on the conventional motor device is large, the motor rotation speed may continue to decrease even with the output duty increased. In such a case, as indicated by point P12, the normal duty limit value (LMT1) decreases as the motor rotation speed decreases.

Next, at point P13, even though the load on the motor device is eliminated or reduced and the conventional motor device temporarily accelerates, the output duty indicated by the waveform W21 reaches the normal duty limit value (LMT1) and is limited, and the motor rotation speed cannot be increased continuously, and the motor rotation speed further decreases. Due to the repetition of the decrease in the normal duty limit value (LMT1) and the decrease in the motor rotation speed, the motor rotation speed cannot return to the target rotation speed indicated by the waveform W10 and the motor device stops.

In contrast thereto, FIG. 5 is a diagram showing an example of the operation related to the duty limit value of the motor device 100 according to this embodiment.

In FIG. 5, the horizontal axis indicates the rotation angle, and the vertical axis indicates the motor rotation speed and the output duty.

Further, the waveform W10 indicates the target rotation speed, and the waveform W12 indicates the motor rotation speed. The waveform W22 indicates the output duty, which is the output command value. Besides, the dotted line LMT1 indicates the normal duty limit value, and the dotted line LMT2 indicates the corrected duty limit value. Furthermore, point P23 indicates the timing at which a sudden load is applied to the motor device 100, and point 25 indicates the timing at which the sudden load on the motor device 100 is eliminated or reduced.

In the example shown in FIG. 5, when a sudden load is applied to the motor device 100 at point P23, as in the conventional art shown in FIG. 4 described above, the output duty indicated by the waveform W22 increases as the motor rotation speed indicated by the waveform W12 decreases. However, in the motor device 100 according to this embodiment, as shown from point P25 onward, the upper limit value setting part 44 switches and changes the duty limit value (LMT) to the corrected duty limit value (LMT2) while the motor 2 is accelerating. Therefore, the motor device 100 is able to avoid the limit due to the duty limit value, and is able to increase the motor rotation speed again as indicated by the waveform W12 and resume the normal operation.

The operation of the motor device 100 in FIG. 5 will be described in more detail. First, from point P21 to immediately before point P22, the motor rotation speed is equal to or less than the rotation speed threshold value (RPMth). In this case, the upper limit value setting part 44 of the controller 40 generates the normal duty limit value (LMT1) corresponding to the motor rotation speed. Further, the upper limit value setting part 44 outputs the normal duty limit value (LMT1) as the duty limit value (LMT).

Next, from point P22 to immediately before point P24, the motor rotation speed is greater than the rotation speed threshold value (RPMth) and is accelerating. In this case, the upper limit value setting part 44 switches the duty limit value (LMT) from the normal duty limit value (LMT1) to the corrected duty limit value (LMT2) and outputs.

Here, since a sudden load occurs at point P23, the motor rotation speed drops. Thus, from point P24 to immediately before point P25, the motor rotation speed is greater than the rotation speed threshold value (RPMth) and is not accelerating. In this case, the upper limit value setting part 44 switches the duty limit value (LMT) from the corrected duty limit value (LMT2) to the normal duty limit value (LMT1) and outputs.

Next, at point 25, the load on the motor device 100 is eliminated or reduced, and the motor rotation speed increases. Thus, from point P25 to immediately before point P26, the motor rotation speed is equal to or less than the rotation speed threshold value (RPMth) and is accelerating. In this case, the upper limit value setting part 44 switches the duty limit value (LMT) from the normal duty limit value (LMT1) to the corrected duty limit value (LMT2) and outputs. Thus, the output duty is increased, making it possible to continuously increase the motor rotation speed.

Next, from point 26 to immediately before point 27, the motor rotation speed is greater than the rotation speed threshold value (RPMth) and is not accelerating. In this case, the upper limit value setting part 44 switches the duty limit value (LMT) from the corrected duty limit value (LMT2) to the normal duty limit value (LMT1) and outputs.

Next, from point P27 to point P28, the motor rotation speed is equal to or less than the rotation speed threshold value (RPMth) and is not accelerating. In this case, the upper limit value setting part 44 continues to output the normal duty limit value (LMT1) as the duty limit value (LMT).

As described above, the motor device 100 according to this embodiment includes the rotationally driven motor 2, the drive signal generator 46, the inverter 50, the rotation speed detector 42, the acceleration detector 43, and the upper limit value setting part 44. The drive signal generator 46 controls the duty ratio indicating the drive output of the motor so as not to exceed the duty ratio upper limit value, and generates a drive signal corresponding to the duty ratio. The inverter 50 outputs an output signal for rotationally driving the motor 2 based on the drive signal. The rotation speed detector 42 detects the rotation speed of the motor 2. The acceleration detector 43 detects whether the motor 2 is accelerating. When the rotation of the motor is accelerating, the upper limit value setting part 44 changes the duty limit value (duty ratio upper limit value) to the corrected duty limit value (second upper limit value) higher than the preset normal duty limit value (first upper limit value).

Thus, the motor device 100 according to this embodiment is able to avoid the output limit due to the duty limit value by the corrected duty limit value (second upper limit value) and is able to increase the motor rotation speed again (see the waveform W12 in FIG. 5) even when the sudden load shown in FIG. 5 mentioned above is applied. Therefore, the motor device 100 according to this embodiment is able to reduce the stoppage of operation due to a sudden decrease in the rotation speed.

Further, in this embodiment, the upper limit value setting part 44 disables the changing process of changing from the normal duty limit value (first upper limit value) to the corrected duty limit value (second upper limit value) when the rotation speed of the motor 2 is equal to or less than the threshold value (equal to or less than the rotation speed threshold value RPMth).

Thus, the motor device 100 according to this embodiment is able to suppress an overcurrent from flowing to the motor 2 due to that, for example, when the behavior of the motor becomes unstable in the low rotation range, the fluctuation in the motor rotation speed is determined as acceleration and the duty limit value (LMT) is increased. Here, the effect of suppressing an overcurrent of the motor device 100 according to this embodiment will be described with reference to FIG. 6 and FIG. 7.

Figure 6:
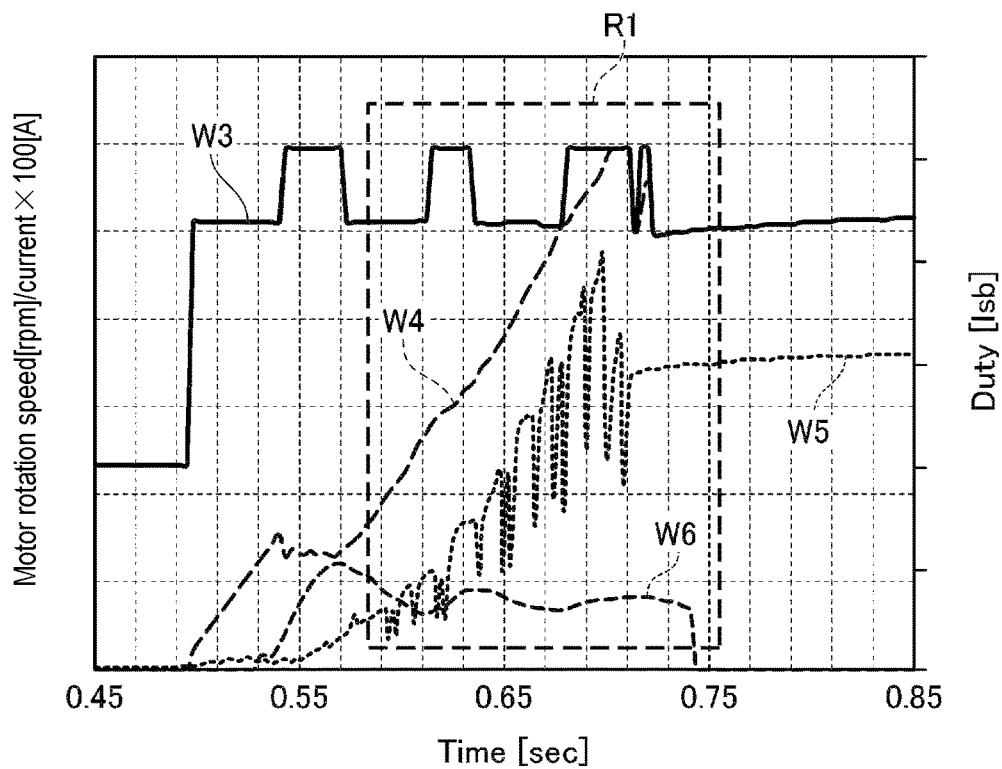
FIG. 6 is a diagram showing an example of the operation of the motor device according to the first embodiment when there is no function of disabling the changing process for the duty limit value.

FIG. 6 is a diagram showing an example of the operation of the motor device 100 according to this embodiment when there is no function of disabling the changing process for the duty limit value. For comparison, FIG. 6 shows an example in which the upper limit value setting part 44 does not disable the changing process for the duty limit value based on the rotation speed threshold value RPMth.

In FIG. 6, the horizontal axis indicates time, and the vertical axis indicates the motor rotation speed, the motor current consumption, and the output duty.

Further, in FIG. 6, the waveform W3 indicates the duty limit value (LMT), and the waveform W4 indicates the output command value (DT). The waveform W5 indicates the current consumption of the motor 2, and the waveform W6 indicates the motor rotation speed.

In the range R1 of FIG. 6, when the behavior of the motor 2 becomes unstable in the low rotation region (see the waveform W6) and the motor 2 temporarily accelerates, the changing process for the duty limit value works, and the upper limit value setting part 44 changes the duty limit value (LMT) to the corrected duty limit value. As a result, the command generator 45 may further increase the output command value (DT) as indicated by the waveform W4, so an overcurrent flows as indicated by the waveform W5.

Figure 7:
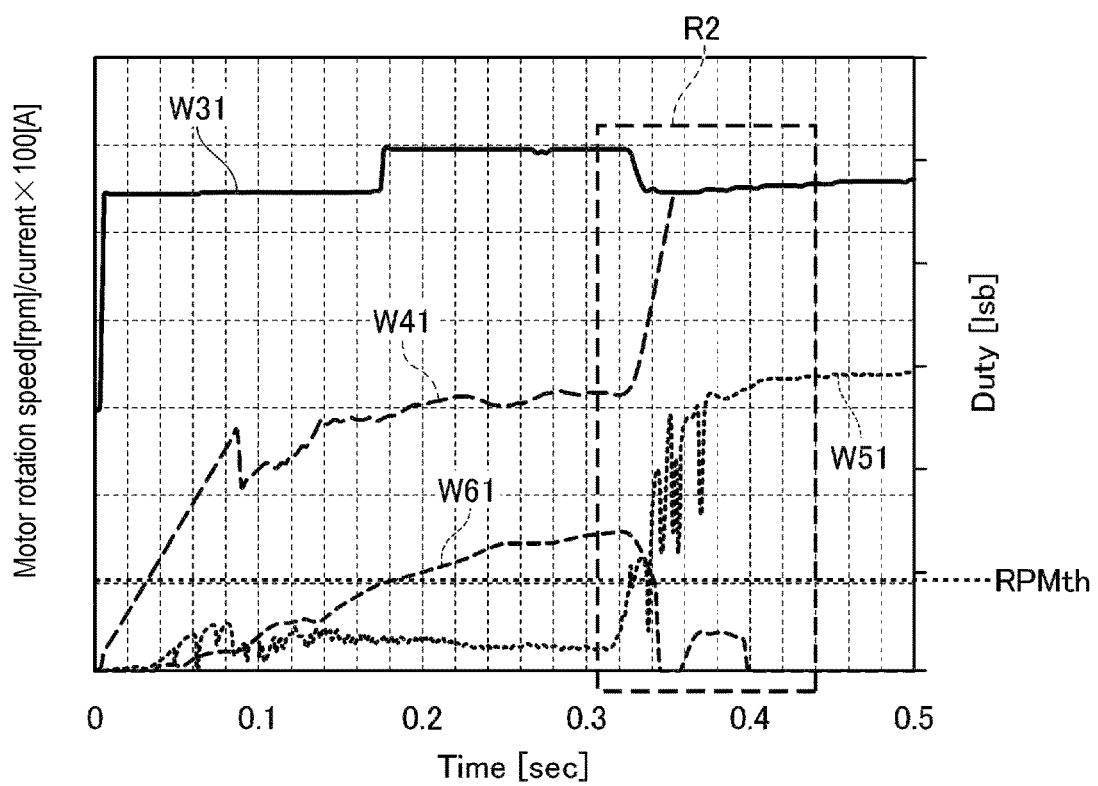
FIG. 7 is a diagram showing an example of the operation of the motor device according to the first embodiment when there is a function of disabling the changing process for the duty limit value.

In contrast thereto, FIG. 7 is a diagram showing an example of the operation of the motor device 100 according to this embodiment when there is a function of disabling the changing process for the duty limit value. That is, for comparison, FIG. 7 shows an example in which the upper limit value setting part 44 disables the changing process for the duty limit value based on the rotation speed threshold value RPMth.

In FIG. 7, the horizontal axis indicates time, and the vertical axis indicates the motor rotation speed, the motor current consumption, and the output duty.

Further, in FIG. 7, the waveform W31 indicates the duty limit value (LMT), and the waveform W41 indicates the output command value (DT). The waveform W51 indicates the current consumption of the motor 2, and the waveform W61 indicates the motor rotation speed. The dotted line RPMth indicates the rotation speed threshold value.

In the range R2 of FIG. 7, even if the behavior of the motor 2 becomes unstable in the low rotation region (see the waveform W61) and the motor 2 temporarily accelerates, the motor rotation speed is equal to or less than the rotation speed threshold value (RPMth), so the upper limit value setting part 44 selects the normal duty limit value as the duty limit value. Thus, the drive signal generator 46 limits the increase in the output command value (DT) as indicated by the waveform W41, making it possible to suppress the occurrence of an overcurrent as indicated by the waveform W51.

As described above, the motor device 100 according to this embodiment is able to suppress an overcurrent from flowing to the motor 2 when the behavior of the motor becomes unstable in the low rotation range, for example.

Further, in this embodiment, the upper limit value setting part 44 changes the normal duty limit value (first upper limit value) in multiple stages according to the rotation speed of the motor 2.

Thus, the motor device 100 according to this embodiment is able to appropriately set the duty limit value depending on the state of the rotation speed of the motor 2.

Furthermore, in this embodiment, the upper limit value setting part 44 changes the corrected duty limit value (second upper limit value) according to the rotation speed of the motor 2.

Thus, the motor device 100 according to this embodiment is able to more appropriately set the duty limit value depending on the state of the rotation speed of the motor 2.

In addition, in this embodiment, the upper limit value setting part 44 may change the corrected duty limit value (second upper limit value) according to the magnitude of the rotational acceleration of the motor 2.

Thus, the motor device 100 according to this embodiment is able to appropriately set the corrected duty limit value (second upper limit value) according to the degree of acceleration, for example, by increasing the corrected duty limit value (second upper limit value) as the rotational acceleration increases.

Moreover, the motor control method according to this embodiment is a motor control method for controlling the motor 2 that is rotationally driven by the output signal output by the inverter 50 based on the drive signal. The motor control method includes a drive signal generating step, a rotation speed detecting step, an acceleration detecting step, and an upper limit value setting step. In the drive signal generating step, the drive signal generator 46 controls the duty ratio indicating the drive output of the motor 2 so as not to exceed the duty limit value (duty ratio upper limit value), and generates the drive signal according to the duty ratio. In the rotation speed detecting step, the rotation speed detector 42 detects the rotation speed of the motor 2. In the acceleration detecting step, the acceleration detector 43 detects whether the motor 2 is accelerating. In the upper limit value setting step, the upper limit value setting part 44 changes the duty limit value (duty ratio upper limit value) to the corrected duty limit value (second upper limit value) higher than the preset normal duty limit value (first upper limit value) when the rotation of the motor 2 is accelerating.

Thus, the motor control method according to this embodiment achieves the same effect as the motor device 100 described above, and is able to reduce the stoppage of operation due to a sudden decrease in the rotation speed.

Besides, the motor control method according to this embodiment further includes an upper limit value setting disabling step in which the upper limit value setting part 44 disables the upper limit value setting step when the rotation speed of the motor 2 is equal to or less than the threshold value.

Thus, the motor control method according to this embodiment is able to suppress an overcurrent from flowing to the motor 2 due to that, for example, when the behavior of the motor becomes unstable in the low rotation range, the fluctuation in the motor rotation speed is determined as acceleration and the duty limit value (LMT) is increased.

Second Embodiment

Next, a wiper device 200 according to the second embodiment will be described with reference to the drawings.

Figure 8:
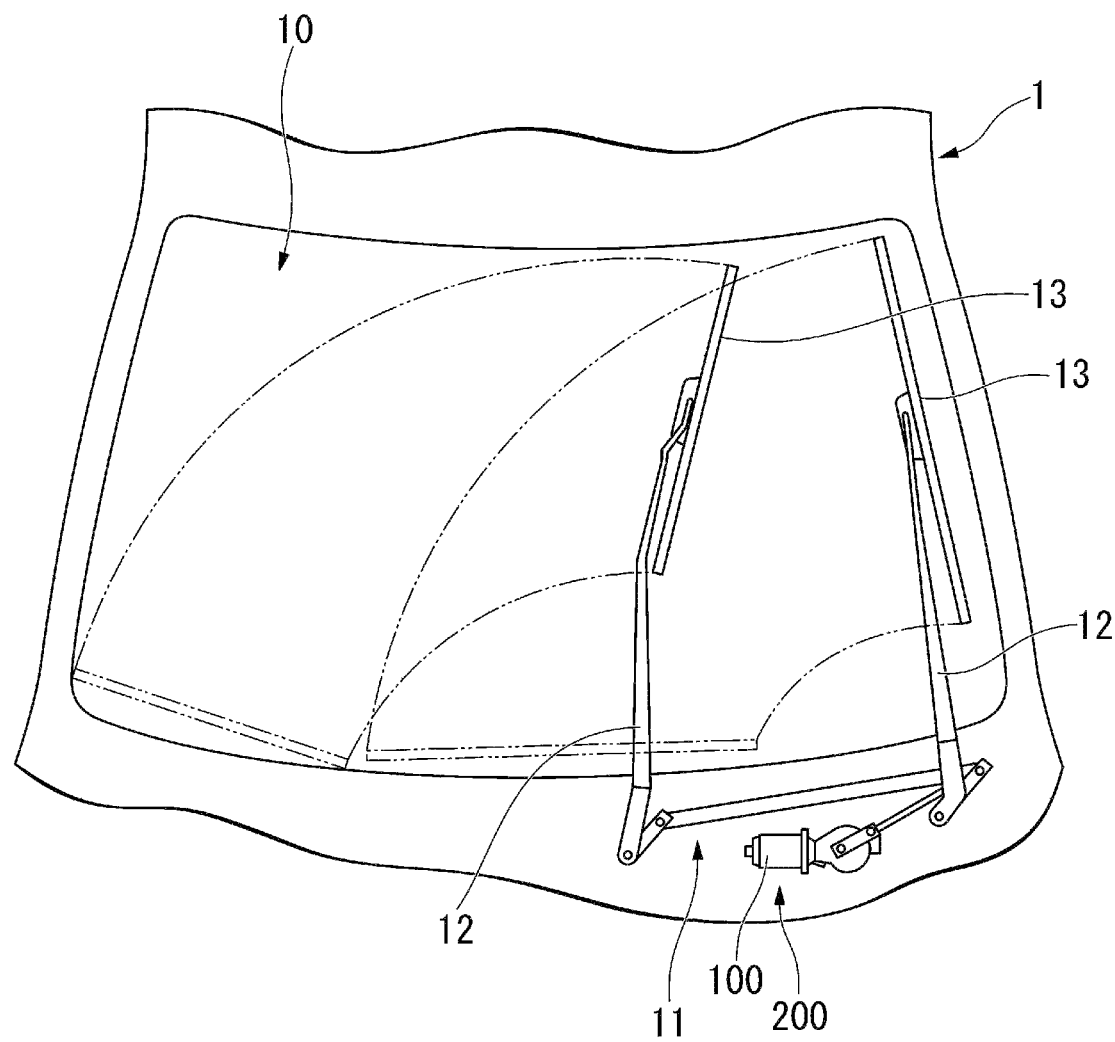
FIG. 8 is a configuration diagram showing an example of the wiper device according to the second embodiment.

FIG. 8 is a configuration diagram showing an example of the wiper device 200 according to the second embodiment.

As shown in FIG. 8, the wiper device 200 performs a wiping operation on the window surface of a window glass 10 of a vehicle 1. The wiper device 200 includes the motor device 100, a link mechanism 11, two wiper arms 12, and a wiper blade 13 attached to the tip of each wiper arm 12.

The motor device is the motor device 100 of the first embodiment described above, and detailed description thereof will be omitted here.

The wiper arm 12 is rotationally driven by the motor device 100 to move on the window surface of the window glass 10, and perform a wiping operation with the wiper blade 13 attached to the tip of the wiper arm 12.

The two wiper arms 12 are connected by the link mechanism 11.

The wiper blade 13 is provided to be pressed against the window glass 10 by the wiper arm 12.

The wiper blade 13 includes a blade rubber (not shown) held by a blade holder attached to the tip of the wiper arm 12. When the wiper arm 12 is swung by the motor device 100, the wiper blade 13 reciprocates within the wiping range on the outer surface of the window glass 10, and wipes the window glass 10 with the blade rubber (not shown).

As described above, the wiper device 200 according to this embodiment uses the motor device 100 to cause the wiper member (wiper arm 12 and wiper blade 13) to perform the wiping operation on the window surface.

Thus, the wiper device 200 according to this embodiment achieves the same effect as the motor device 100 described above, and is able to reduce the stoppage of operation due to a sudden decrease in the rotation speed. For example, in the case where suddenly a strong wind blows against the wiper member (wiper arm 12 and wiper blade 13), snow falls, or it is intended to wipe away large foreign objects (insects, bird droppings or the like) adhering to the window glass 10, which causes the load to increase, the wiper device 200 according to this embodiment is able to resume the normal wiping operation by accelerating again when the strong wind stops and when the snow and foreign objects are removed.

It should be noted that the invention is not limited to the above embodiments, and can be modified without departing from the scope of the invention.

For example, although the above embodiment illustrates an example in which the three-phase armature coils ($21u$, $21v$, $21w$) of the motor 2 are connected by delta connection, the invention is not limited thereto, and other connections such as star connection may be used.

In addition, although the above embodiment illustrates an example in which the upper limit value setting part 44 sets the corrected duty limit value by adding the correction amount (a) to the normal duty limit value, the invention is not limited thereto, and the corrected duty limit value may be set by other methods such as multiplying the normal duty limit value by a coefficient value.

Further, although the above embodiment illustrates an example in which the motor device 100 is used in the wiper device 200, the invention is not limited thereto, and the motor device 100 may also be used for other purposes.

Each configuration included in the motor device 100 described above has a computer system therein. Then, a program for realizing the function of each configuration included in the motor device 100 described above may be recorded in a computer-readable recording medium, and the program recorded in this recording medium may be loaded into the computer system and executed so as to perform the processing in each configuration included in the motor device 100 described above. Here, "loading and executing the program recorded in the recording medium into the computer system" includes installing the program in the computer system. The "computer system" here includes hardware such as an OS and peripheral devices.

In addition, the "computer system" may include a plurality of computer devices connected via a network that includes communication lines such as the Internet, WAN, LAN, and dedicated lines. Moreover, the "computer-readable recording medium" refers to a portable medium such as a flexible disk, a magneto-optical disk, a ROM, and a CD-ROM, and a storage device such as a hard disk built in the computer system. Thus, the recording medium storing the program may be a non-transitory recording medium such as a CD-ROM.

Furthermore, some or all of the functions described above may be implemented as an integrated circuit such as an LSI (Large Scale Integration). Each of the functions mentioned above may be made into a processor individually, or some or all of the functions may be integrated and made into a processor. Also, the method of circuit integration is not limited to LSI, and may be implemented by a dedicated circuit or a general-purpose processor. In addition, when a circuit integration technology that replaces LSI becomes available because of progress in semiconductor technology, an integrated circuit based on the technology may be used.

What is claimed is:

1. A motor device, comprising:
a motor that is rotationally driven;
a drive signal generator that controls a duty ratio indicating a drive output of the motor so as not to exceed a duty ratio upper limit value, and generates a drive signal corresponding to the duty ratio;
an inverter that outputs an output signal for rotationally driving the motor based on the drive signal;
a rotation speed detector that detects a rotation speed of the motor;
an acceleration detector that detects whether the motor is accelerating; and
an upper limit value setting part that changes the duty ratio upper limit value to a second upper limit value higher than a preset first upper limit value in response to rotation of the motor being accelerating, wherein
the upper limit value setting part disables a changing process of changing from the first upper limit value to the second upper limit value in response to the rotation speed of the motor being equal to or less than a threshold value.

2. The motor device according to claim 1, wherein the upper limit value setting part changes the first upper limit value in a plurality of stages according to the rotation speed of the motor.

3. The motor device according to claim 1, wherein the upper limit value setting part changes the second upper limit value according to the rotation speed of the motor.

4. The motor device according to claim 1, wherein the upper limit value setting part changes the second upper limit value according to a magnitude of a rotational acceleration of the motor.

5. A wiper device, comprising:
the motor device according to claim 1, wherein the motor device is used to cause a wiper member to perform a wiping operation on a window surface.

6. A motor control method for controlling a motor that is rotationally driven by an output signal output by an inverter based on a drive signal, the motor control method comprising:
- drive signal generating in which a drive signal generator controls a duty ratio indicating a drive output of the motor so as not to exceed a duty ratio upper limit value, and generates the drive signal corresponding to the duty ratio;
- rotation speed detecting in which a rotation speed detector detects a rotation speed of the motor;
- acceleration detecting in which an acceleration detector detects whether the motor is accelerating;
- upper limit value setting in which an upper limit value setting part changes the duty ratio upper limit value to a second upper limit value higher than a preset first upper limit value in response to rotation of the motor being accelerating; and
- upper limit value setting disabling in which the upper limit value setting part disables the upper limit value setting in response to the rotation speed of the motor being equal to or less than a threshold value.

7. The motor device according to claim 2, wherein
the upper limit value setting part changes the second upper limit value according to the rotation speed of the motor.

8. The motor device according to claim 2, wherein
the upper limit value setting part changes the second upper limit value according to a magnitude of a rotational acceleration of the motor.

* * * * *